United States Patent
Espino (10) Patent No.: US 10,587,186 B2
(45) Date of Patent: Mar. 10, 2020

(54) CURRENT DAMPING CIRCUIT

(71) Applicant: Power Integrations, Inc., San Jose, CA (US)

(72) Inventor: Marvin Espino, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/022,244

(22) Filed: Jun. 28, 2018

(65) Prior Publication Data

US 2019/0006938 A1    Jan. 3, 2019

Related U.S. Application Data

(60) Provisional application No. 62/526,730, filed on Jun. 29, 2017.

(51) Int. Cl.
| | | |
|---|---|---|
| *H02M 1/42* | (2007.01) | |
| *H02M 1/32* | (2007.01) | |
| *G05F 1/575* | (2006.01) | |
| *H02M 3/158* | (2006.01) | |

(52) U.S. Cl.
CPC .......... *H02M 1/4208* (2013.01); *G05F 1/575* (2013.01); *H02M 1/4266* (2013.01); *H02M 3/1582* (2013.01)

(58) Field of Classification Search
CPC ............ H02M 1/4208; H02M 1/4258; H02M 1/4266; H02M 1/34; H02M 1/32
USPC .................................................... 363/15–22
See application file for complete search history.

(56) References Cited

U.S. PATENT DOCUMENTS

| | | | | |
|---|---|---|---|---|
| 5,187,653 | A * | 2/1993 | Lorenz ................... | H02H 9/001 323/908 |
| 5,331,213 | A * | 7/1994 | Ohmori ................... | H03K 5/08 307/108 |
| 5,535,115 | A * | 7/1996 | Kishi .................. | H02M 7/5387 363/41 |
| 5,715,154 | A * | 2/1998 | Rault ..................... | H02H 9/001 323/908 |
| 6,049,446 | A * | 4/2000 | Ha ......................... | H02H 9/001 340/653 |
| 6,204,612 | B1 * | 3/2001 | Liu .......................... | H02H 3/14 315/200 R |
| 6,714,429 | B2 * | 3/2004 | Phadke .................. | H02H 9/001 323/222 |
| 8,638,533 | B2 * | 1/2014 | Uenishi ................. | H01L 29/404 361/56 |
| 8,854,103 | B2 * | 10/2014 | Willemen ........ | H03K 17/08122 327/310 |
| 2003/0193361 | A1 * | 10/2003 | Romas, Jr. ............. | H01C 17/24 327/308 |

(Continued)

*Primary Examiner* — Jeffrey A Gblende
*Assistant Examiner* — Sisay G Tiku
(74) *Attorney, Agent, or Firm* — Andrew J. Borja (57) ABSTRACT

A circuit for shaping an input current of a switching power converter. The circuit is a power factor circuit comprising an input to be coupled to receive a rectified line signal, an output, a resistance coupled to resist a flow of current from the input to the output. The resistance has a first value and a switch coupled in parallel with the resistance and coupled to switch from a less conductive state into a more conductive state in response to the flow of current through the input, and the more conductive state is sufficiently conductive to divert a portion of the current flow away from the resistance.

14 Claims, 4 Drawing Sheets

(56) References Cited

U.S. PATENT DOCUMENTS

| | | | |
|---|---|---|---|
| 2011/0261594 A1* | 10/2011 | Joshi | H02M 3/33569 |
| | | | 363/21.12 |
| 2011/0304940 A1* | 12/2011 | Cao | H01L 23/60 |
| | | | 361/56 |
| 2012/0092798 A1* | 4/2012 | Hwang | H01L 27/0259 |
| | | | 361/56 |
| 2013/0057167 A1* | 3/2013 | Angeles | H05B 33/0815 |
| | | | 315/200 R |
| 2015/0103568 A1* | 4/2015 | Del Carmen, Jr. | |
| | | | H02M 3/33507 |
| | | | 363/21.16 |
| 2016/0218626 A1* | 7/2016 | Del Carmen, Jr. | |
| | | | H05B 33/0815 |
| 2017/0027029 A1* | 1/2017 | Hu | H05B 33/0815 |
| 2018/0109177 A1* | 4/2018 | Truong | H02H 9/001 |
| 2019/0036519 A1* | 1/2019 | Hu | H03K 5/08 |

\* cited by examiner

CURRENT DAMPING CIRCUIT

CROSS-REFERENCE TO RELATED APPLICATION

This application claims priority to U.S. Provisional Application No. 62/526,730 filed on Jun. 29, 2017, the contents of which are incorporated herein by reference.

BACKGROUND INFORMATION

Field of the Disclosure

The present invention relates generally to current dampening circuits used with power converters.

Background

Electronic devices use power to operate. Switched mode power converters are commonly used due to their high efficiency, small size, and low weight to power may of today's electronics. Conventional wall sockets provide a high voltage alternating current. In a switching power converter, the high voltage alternating current (ac) input is converted to provide a well-regulated direct current (dc) output through an energy transfer element. The switched mode power converter usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples of a power factor circuit in use with switching power converters to dampen an input current are described herein. In particular, in many circumstances, it would be favorable of the input current to a switching power converter did not change unduly rapidly and remained relatively low. For example, in switching power converters that may operate the majority of the time in standby mode, a low standby current can be beneficial to increasing the power factor. To increase the power factor, magnetic components may be used to reduce the RMS input current, but the cost of the power converter may increase significantly.

As described herein, a power factor circuit can be configured to reduce the inrush input current during light- or no-load conditions without impeding the input current when the power demanded by the load increases.

Figure 1:
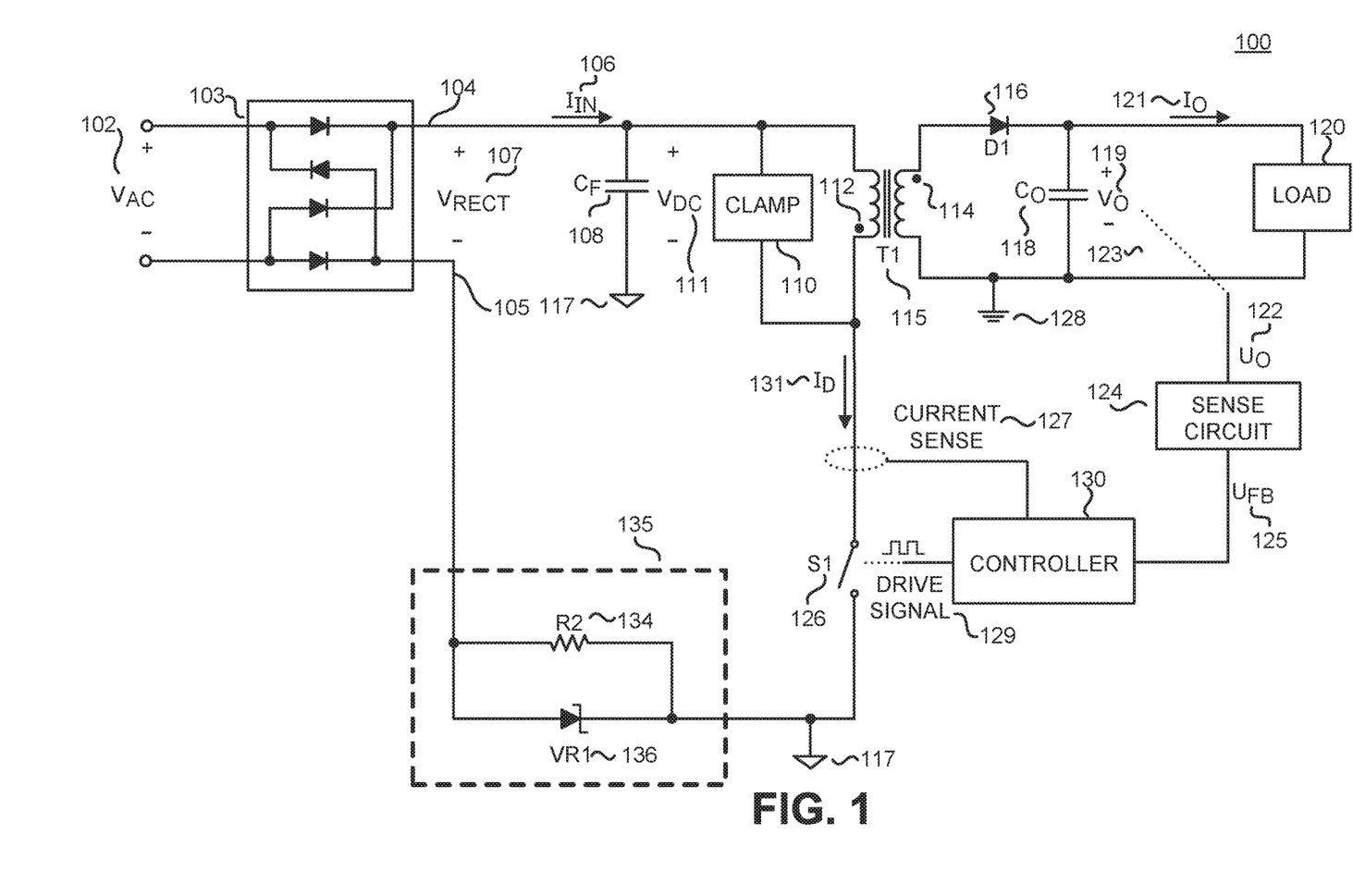
FIG. 1 illustrates one example of a power factor circuit for use with a power converter in accordance with teachings of the present invention.

To illustrate, FIG. 1 shows a functional block diagram of an example power converter 100. As illustrated, power converter 100 includes a rectifier 103, an input capacitor $C_F$ 108, a clamp circuit 110, an energy transfer element T1 115, a primary winding 112 of the energy transfer element T1 115, a secondary winding 114 of the energy transfer element T1 115, an input return 117, a rectifier D1 116, an input return 117, an output capacitor $C_O$ 118, a sense circuit 124, a power switch 126, a controller 130, and a power factor circuit 135.

FIG. 1 further illustrates an ac input voltage $V_{AC}$ 102, a rectified voltage $V_{RECT}$ 107, an input capacitor voltage VDC 108, an output voltage $V_O$ 119, an output current $I_O$ 121, an output quantity $U_O$ 122, a feedback signal $U_{FB}$ 125, a current sense signal 127, a drain current $I_D$ 131, and a load 120.

The example switched mode power converter 100 illustrated in FIG. 1 is coupled in a flyback configuration. The flyback topology is just one example topology of a switched mode power converter that may benefit from the teachings of the present invention. It is appreciated that other topologies and configurations of switched mode power converters may also benefit from the teachings of the present invention. In one example, a buck converter, buck-boost, and forward converter topologies may work as well. In addition, the example power converter shown in FIG. 1 is an isolated power converter. It should be appreciated that non-isolated power converters may also benefit from the teachings of the present invention.

The power converter 100 provides output power to a load 120 from an unregulated input voltage. In one embodiment, the input voltage is an ac input voltage $V_{AC}$ 102. In another embodiment, the input voltage is a rectified ac input voltage such as rectified voltage $V_{RECT}$ 107. The rectifier 103 outputs rectified voltage $V_{RECT}$ 107. In one embodiment, rectifier 103 may be a bridge rectifier. The rectifier 103 further couples to the energy transfer element T1 115. In some embodiments of the present invention, the energy transfer element T1 115 may be a coupled inductor. In other embodiments, the energy transfer element T1 115 may be a transformer. In other embodiments (including non-isolated power converters), the energy transfer element may be an inductor. In the example of FIG. 1, the energy transfer element T1 115 includes two windings, namely, a primary winding 112 and a secondary winding 114. However, it should be appreciated that other energy transfer elements may have more than two windings. In the example of FIG. 1, primary winding 112 may be considered an input winding and secondary winding 114 may be considered an output winding. The primary winding 112 is further coupled to a power switch 126, which is then further coupled to input return 117.

In addition, clamp circuit 110 is illustrated in the example of FIG. 1 as being coupled across the primary winding 112 of the energy transfer element T1 115. The input capacitor $C_F$ 108 may also be coupled across the primary winding 112, as shown.

Secondary winding 114 of the energy transfer element T1 115 is coupled to the rectifier D1 116. In the example of FIG. 1, the rectifier D1 116 is a diode. Both the output capacitor $C_O$ 118 and the load 120 are shown in FIG. 1 as being coupled to the rectifier D1 116.

The power converter 100 further comprises circuitry to regulate the output. In FIG. 1, the output is denoted as output quantity $U_O$ 122. In general, output quantity $U_O$ 122 can be an output voltage $V_O$ 119, an output current $I_O$ 121, or a combination of the two. A sense circuit 124 is coupled to sense the output quantity $U_O$ 122 and to provide a feedback signal $U_{FB}$ 131 which is representative of the output quantity $U_O$ 122. Feedback signal $U_{FB}$ 125 may be a voltage signal or a current signal. In some examples, the sense circuit 124 may sense the output quantity $U_O$ 122 from an additional winding included in the energy transfer element T1 115.

In some examples, the controller 130 may be galvanically isolated from the sense circuit 124. For example, devices such as an opto-coupler, a capacitor, or a magnetic coupling can be used to carry signals between a controller 130 and a sense circuit 124 that are referenced to different grounds. In some cases, the sense circuit 124 may utilize a voltage divider to sense the output quantity $U_O$ 122 from the output of the power converter 100.

The power factor circuit 135 includes a current shaping resistor R2 134 and a first zener diode VR1 136. In one example, the power factor circuit 135 is coupled to a negative terminal 105 of the rectifier circuit 103 along the return rail of the power converter. In other examples, the power factor circuit 135 may be coupled to positive terminal 104 along the forward rail of the power converter (see, e.g., FIG. 3).

In operation, the switching power converter 100 of FIG. 1 provides output power to the load 120 from an unregulated input such as the ac input voltage $V_{AC}$ 102. The rectifier circuit 104 is coupled to output the rectified voltage $V_{RECT}$ 107. The input capacitor $C_F$ 108 filters the high frequency current from the power switch S1 126. For power converters with power factor correction (PFC), input capacitor $C_F$ 108 has a relative small capacitance such that the voltage applied to the energy transfer element T1 115 substantially follows the rectified voltage $V_{RECT}$ 107. In these cases, the value of the input capacitor $C_F$ 108 allows the voltage on the input capacitor $C_F$ 108 to reach substantially zero during each half-line cycle of the input line voltage. In other words, the voltage on the input capacitor $C_F$ 108 substantially follows the positive magnitude of the ac input voltage $V_{AC}$ 102.

In switching power converter 100, energy transfer element T1 115 transfers energy between the primary winding 112 and the secondary winding 114. The clamp circuit 110 is coupled across the primary winding 112 to limit the maximum voltage on the power switch S1 126. Power switch S1 126 is opened and closed in response to the drive signal 129. It is to be understood that a switch that is closed conducts current and is considered "on," whereas current conduction through a switch that is open is restricted and the switch is considered "off" In operation, the switching of the power switch S1 126 produces a pulsating current at the rectifier D1 116. The current in the rectifier D1 116 is filtered by the output capacitor $C_O$ 118 to produce a regulated output voltage $V_O$ 119, a regulated output current $I_O$ 121, or a regulated combination of the two at the load 120.

The sense circuit 124 senses the output quantity $U_O$ 123 of the power converter 100 to provide the feedback signal $U_{FB}$ 125 to the controller 130. The feedback signal $U_{FB}$ 125 may be a voltage signal or a current signal. The feedback signal $U_{FB}$ 125 provides information regarding the output quantity $U_O$ 123 to the controller 130. In addition, the controller 130 receives the current sense input signal 127 which represents the switch current $I_D$ 131 in the power switch S1 126. The switch current $I_D$ 131 may be sensed in a variety of ways. For example, switch current $I_D$ 131 may be sensed as a voltage across a discrete resistor or as the voltage dropped across a transistor when the transistor is conducting. The controller 130 outputs a drive signal 129 to operate the switch S1 126 in response to various system inputs to substantially regulate the output quantity $U_O$ 123 to the desired value. In one embodiment, the drive signal 129 may be a rectangular pulse waveform with varying duration high and low sections. In general, the high sections will drive the switch S1 126 into a closed, more conductive "ON" state and the low sections will drive the switch S1 126 into an open, less conductive "OFF" state. In another embodiment, the drive signal 129 may include substantially fixed-duration of high (or ON) pulses and be regulated by variation of the number of ON pulses per unit time.

During a light or no load condition, the peak input current or root mean square (rms) input current $I_{IN}$ 106 should not exceed a peak input current that is defined, e.g., by regulatory standards or an application-specific design requirement. Power factor circuit 135 dampens the inrush of input current $I_{IN}$ 106 to satisfy such regulatory standards or design requirements.

In particular, as mentioned previously, the rectifier 103 can be implemented as a bridge rectifier. A bridge rectifier includes diodes that are forward biased at different times. Namely, different diodes in a bridge rectifier will be forward biased when the voltage on its respective anode is (a diode-drop) greater than the capacitor voltage VDC 111. This allows input current $I_{IN}$ 106 to flow through the diode and charge the input capacitor $C_F$ 108. When the voltage on a respective anodes is less than (a diode-drop above) the capacitor voltage VDC 111, the diode is reverse biased and input current $I_{IN}$ 106 does not flow through that diode.

Power factor circuit 135 dampens the inrush of input current $I_{IN}$ 106 at light- or no-load conditions both by resisting the flow of a portion of input current $I_{IN}$ 106 and by lowering the voltage to which the input capacitor $C_F$ 108 is charged. In particular, current shaping resistor 134 and input capacitor $C_F$ 108 are both coupled to input return 117. Whenever input current $I_{IN}$ 106 flows, current shaping resistor 134 resists a portion of input current $I_{IN}$ 106 and a portion of the rectified voltage $V_{RECT}$ 107 is dropped across current shaping resistor 134. As a result of this current drop, the voltage to which input capacitor $C_F$ 108 is charged is lowered and the voltage on an anode of a diode in the bridge rectifier rises (a diode-drop) above the voltage on input capacitor $C_F$ 108 sooner within a line cycle. Further, current shaping resistor 134 resists a portion of the input current $I_{IN}$ 106 flow driven by this lower voltage. Thus, the initial magnitude of the input current $I_{IN}$ 106 is reduced and the portion of a line cycle during which input current $I_{IN}$ 106 flows is increased.

Although current shaping resistor 134 may beneficially dampen the inrush of input current $I_{IN}$ 106 at light- or no-load conditions, it is undesirable for current shaping resistor 134 to resist current flow at high load conditions. In particular, the power consumed by current shaping resistor 134 is proportional to the square of the portion of input current $I_{IN}$ 106 that passes through current shaping resistor 134. When the load condition changes such that the power converter 100 is called upon to deliver increased amounts of power, the increase in input current $I_{IN}$ 106 may be impeded by the current shaping resistor 134.

However, power factor circuit 135 includes a Zener diode 136 that addresses this issue. In particular, Zener diode 136 is placed in parallel with the current shaping resistor R2 136 and, upon reaching breakdown, acts a switch that allows current to bypass current shaping resistor R2 136. The breakdown voltage of Zener diode 136 clamps the voltage across current shaping resistor R2 134 and sets an upper limit on the power consumption by current shaping resistor 134. As a result, the impact of current shaping resistor R2 134 on input current $I_{IN}$ 106 outside of light or no load conditions is reduced.

Figure 2A:
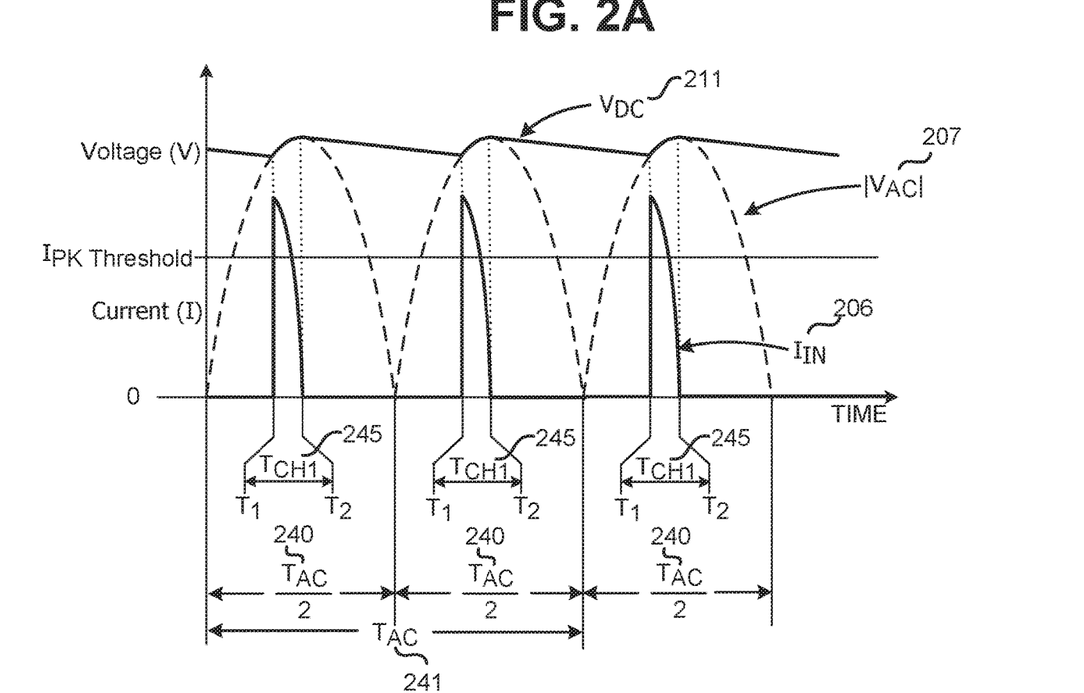
FIG. 2A illustrates one example of a timing diagram of a rectified voltage, an input capacitor voltage and an input current in accordance with teachings of the present invention.

FIG. 2A illustrates waveforms of the rectified voltage, the voltage of the input capacitor and the input current of a power converter without a power factor circuit 135. The rectified voltage $V_{AC}$ 207 is generally a positive-rectified sinusoidal waveform. The rectified voltage includes a series of half line cycles $T_{AC}/2$ 240 demarked by adjacent zero crossings and full line cycles $T_{AC}$ 241 formed by two consecutive half line cycles.

Initially during each half line cycle, input current $I_{IN}$ 206 has a relatively small value (shown, for illustrative purposes, as zero) until the voltage on an anode of a diode in the bridge rectifier rises (a diode-drop) above the capacitor voltage $V_{DC}$ 211. Once this happens at time t1, input current $I_{IN}$ 206 rapidly rises to charge the input capacitor for a charging time $T_{CH1}$ 245. Without power factor circuit 135, current shaping resistor R2 136 does not resist this current flow. At time t2, the voltage on an anode of a diode in the bridge rectifier falls below (a diode-drop) above the capacitor voltage $V_{DC}$ 211 and the input capacitor stops charging. The input current $I_{IN}$ 206 returns to a relatively low value (once again shown as zero for illustrative purposes).

Depending on the particulars of the circuit, the peak value of the input current $I_{IN}$ 206 may rise above a peak current threshold $I_{PK}$, as schematically represented in FIG. 2A. The peak current threshold $I_{PK}$ may be determined, e.g., by a regulatory standard or application-specific design requirements.

Figure 2B:
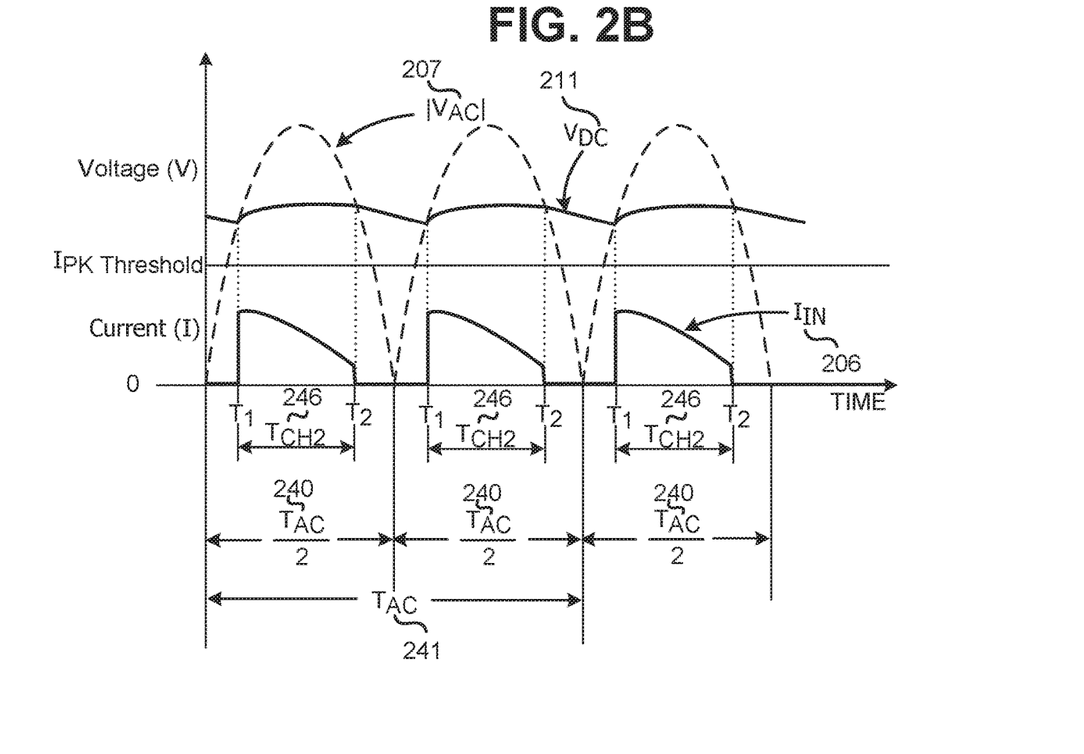
FIG. 2B illustrates one example of a timing diagram of a rectified voltage, an input capacitor voltage and input current that uses the power factor circuit of FIG. 1 in accordance with teachings of the present invention.

FIG. 2B illustrates waveforms of the rectified voltage, the voltage of the input capacitor and the input current of a power converter that includes a power factor circuit, such as power converter 100 in FIG. 1. For example, in one case, a power converter 100 can include a current shaping resistor R2 134 with resistance of 20 kilohms.

Once again, the rectified voltage $V_{AC}$ 207 is generally a positive-rectified sinusoidal waveform that includes a series of half line cycles $T_{AC}/2$ 240 demarked by adjacent zero crossings and full line cycles $T_{AC}$ 241 formed by two consecutive half line cycles.

Initially during each half line cycle, the voltage on the anodes of the diodes in the bridge rectifier is less than (a diode-drop above) the capacitor voltage $V_{DC}$ 211 and input current $I_{IN}$ 206 is essentially zero. At time t1, the voltage on the anode of one of the diodes in the bridge rectifier rises (a diode drop) above the capacitor voltage $V_{DC}$ 211, input current $I_{IN}$ 206 flows, and the input capacitor begins to charge. Since the voltage to which input capacitor $C_F$ 108 is charged is lowered, input current $I_{IN}$ 206 starts to flow earlier in each half-line cycle.

With current shaping resistor R2 134 resisting the flow, the magnitude of input current $I_{IN}$ 206 is reduced. The input current $I_{IN}$ 206 continues to charge the input capacitor for a charging time $T_{CH2}$ 246. Since the voltage to which input capacitor $C_F$ 108 is charged is relatively lower, input current $I_{IN}$ 206 continues to flow later in each half-line cycle and the charging time $T_{CH2}$ 246 has a longer duration than the charging time of $T_{au}$ 245 in FIG. 2A. At time t2, the capacitor voltage $V_{DC}$ 211 stops charging because the voltage on the anode of one of the diodes in the bridge falls (a diode drop above) the capacitor voltage $V_{DC}$ 211 and input current $I_{IN}$ 206 returns to a relatively low value (once again shown, for illustrative purposes, as zero).

Figure 3:
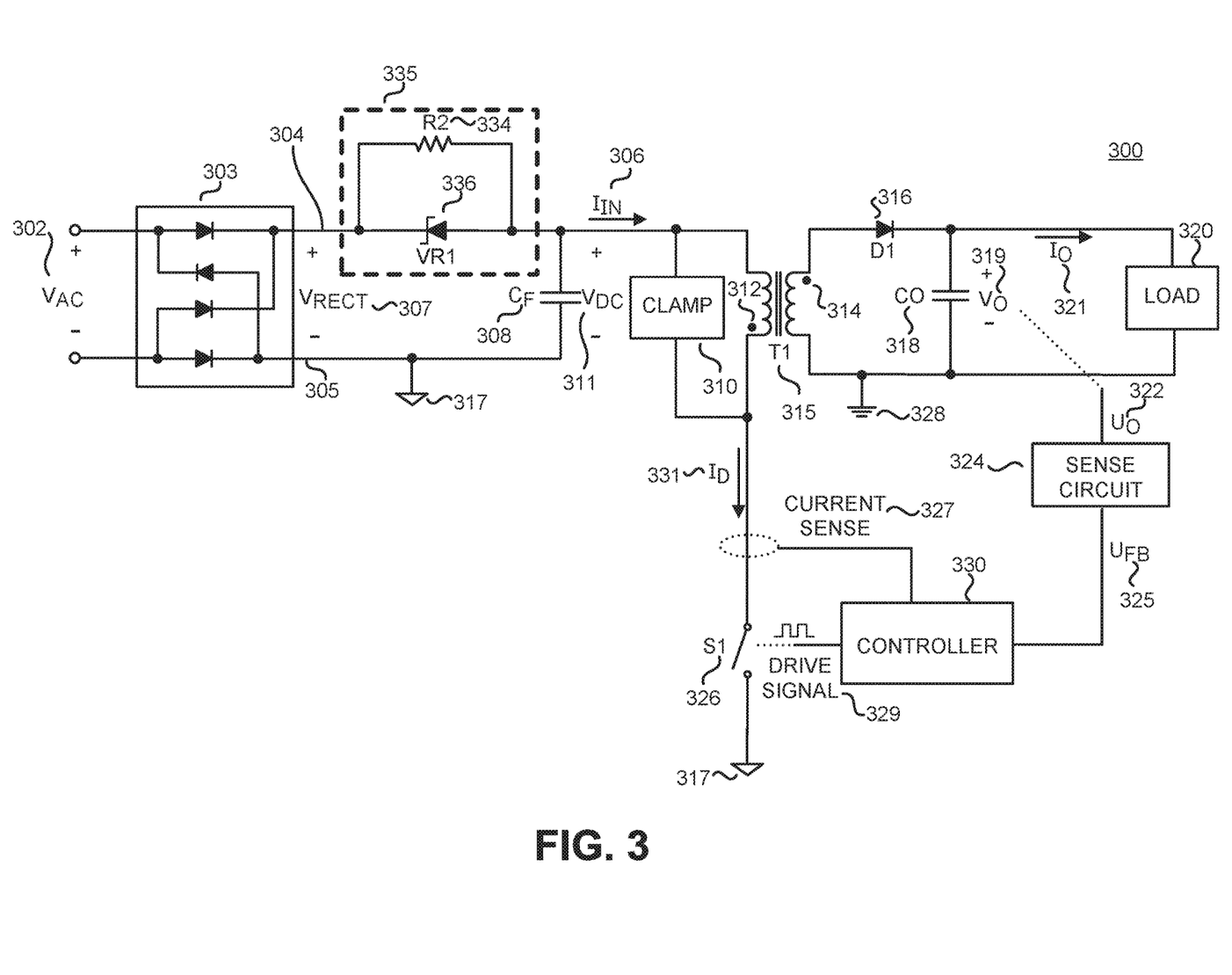
FIG. 3 illustrates another example of a power factor circuit for use with a power converter in accordance with teachings of the present invention.

The peak input current can thus be maintained below a peak current threshold. FIG. 3 illustrates a functional block diagram of an example power converter 300 with a power factor circuit 335. The power factor circuit 335 is a similar circuit to that described in FIG. 1. However, in FIG. 3, the power factor circuit 335 is coupled to the positive terminal 104 of the rectifier 103 along the forward rail of the power converter 300.

Figure 4A:
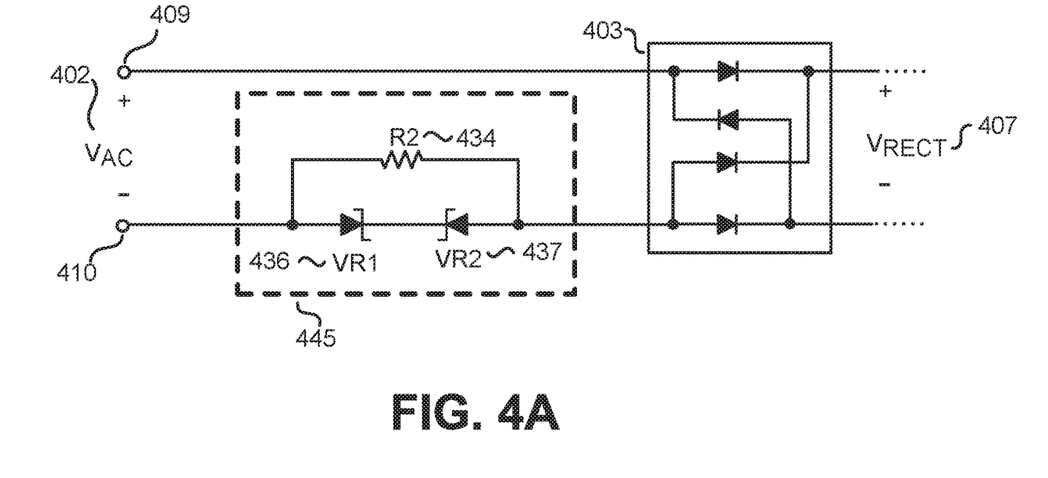
FIG. 4A illustrates one example of a power factor circuit in accordance with teachings of the present invention.

FIG. 4A illustrates an alternative power factor circuit for a power converter. In particular, a power factor circuit 435 provides the same function as power factor circuits 135, 335 described above.

The power factor circuit 435 includes a resistor R2 434, a first Zener diode VR1 436, and a second Zener diode VR2 437. The cathode of the first Zener diode VR1 436 is coupled to the cathode of the second Zener diode VR2 437. The current shaping resistor R2 434 is coupled to the anode of the first Zener diode VR1 436 and to the anode of the second Zener diode VR2 437. Relative to power factor circuits 135, 335, the additional Zener diode provides the same functionality for both positive and negative swings of the ac voltage.

Figure 4B:
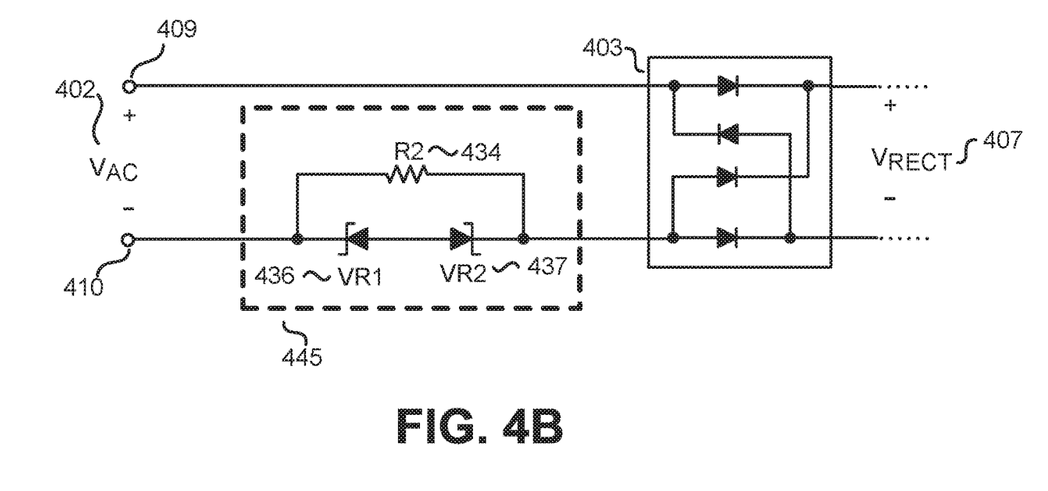
FIG. 4B illustrates another example of a power factor circuit in accordance with teachings of the present invention.

FIG. 4B illustrates an alternative placement of the power factor circuit 445 for a power converter. The power factor circuit 435 includes a resistor R2 434, a first Zener diode VR1 436, and a second Zener diode VR2 437. The anode of the first Zener diode VR1 436 is coupled to the anode of the second Zener diode VR2 437. The current shaping resistor R2 434 is coupled to the cathode of the first Zener diode VR1 436 and to the cathode of the second Zener diode VR2 437. Relative to power factor circuits 135, 335, the additional Zener diode provides the same functionality for both positive and negative swings of the ac voltage.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A power factor circuit for shaping a root mean square (RMS) input current of a switching power converter, comprising:
    an input configured to receive a rectified line signal;
    an output;
    a resistance configured to reduce the RMS input current to below a peak current threshold in order to increase a power factor of the switching power converter, wherein the RMS input current charges an input capacitor of the switching power converter when the rectified line signal is above a voltage of the input capacitor; and
    a switch coupled in parallel with the resistance, the switch configured to switch from an off state in response to a voltage across the resistance that is below a threshold due to a decrease of power demand by a load of the switching power converter, the switch further configured to switch into an on state in response to the voltage across the resistance rising above a threshold due to increase of power demand by the load of the switching power converter, the switch further configured to divert a portion of the RMS input current away from the resistance when the switch is in the on state.

2. The power factor circuit of claim 1, wherein the switch comprises a first zener diode that is coupled in parallel with the resistance to clamp a voltage across the resistance.

3. The power factor circuit of claim 2, wherein the switch further comprises a second zener diode coupled in series with the first zener diode.

4. The power factor circuit of claim 3, wherein an anode of the first zener diode is coupled to an anode the second zener diode.

5. The power factor circuit of claim 3, wherein a cathode of the first zener diode is coupled to a cathode of the second zener diode.

6. The power factor circuit of claim 1, wherein the switching power converter comprises the switching power converter with power factor correction.

7. The power factor circuit of claim 6, wherein the switching power converter comprises a flyback power converter.

8. The power factor circuit of claim 6, wherein the input of the power factor circuit is coupled to a return rail of the switching power converter.

9. A switching power converter comprising:
    a rectifier configured to receive an input line signal, the rectifier further configured to generate a rectified input line signal;
    an energy transfer element coupled between the rectifier and an output of the switching power converter;
    a power switch coupled to the energy transfer element;
    a capacitance configured to be charged by the rectified input line signal; and
    circuitry coupled to the capacitance and configured to prevent the rectified input line signal from charging the capacitance, wherein the rectified input line signal that is prevented from charging the capacitance is of longer time duration when power demand by a load coupled to the output of the switching power converter is lower and the rectified input line signal that is prevented from charging the capacitance is of shorter time duration when power demand by the load coupled to the output of the switching power converter is higher.

10. A flyback switching power converter with power factor correction, the flyback switching power converter comprising:
    a rectifier configured to receive an input line signal, the rectifier further configured to generate a rectified input line signal;
    a capacitance configured to charge to a first voltage by an root mean square (RMS) input current when the rectified input line signal is greater than a voltage of the capacitance;
    an energy transfer element coupled to the capacitance and to an output of the flyback switching power converter;
    a power switch coupled to the energy transfer element, the power switch configured to transfer energy from an input of the flyback switching power converter to the output of the flyback switching power converter;
    a resistance configured to reduce the RMS input current to below a peak current threshold in response to a decrease a power demand by a load coupled to the flyback switching power converter, wherein the capacitance is configured to charge to a voltage less than the first voltage; and
    a zener diode coupled to the resistance, the zener diode configured to bypass the resistance upon reaching a breakdown voltage in response to an increase in the power demand by the load coupled to the output of the flyback switching power converter.

11. A flyback switching power converter with power factor correction, the flyback switching power converter comprising:
    a rectifier configured to receive an input line signal, the rectifier further configured to generate a rectified input line signal;
    a capacitance configured to charge to a first voltage by an input current when the rectified input line signal is greater than a voltage of the capacitance;
    an energy transfer element coupled to the capacitance and to an output of the flyback switching power converter;

a power switch coupled to the energy transfer element, the power switch configured to transfer energy from an input of the flyback switching power converter to the output of the flyback switching power converter;

a resistance configured to reduce the input current to below a peak current threshold in response to a decrease in power demand by a load coupled to the flyback switching power converter, wherein the capacitance is configured to charge to a voltage less than the first voltage; and a pair of zener diodes coupled in parallel to the resistance, the pair of zener diodes configured to bypass the resistance upon a voltage of the pair of zener diodes reaching a breakdown value in response to an increase in the power demand by the load coupled to the flyback switching power converter for positive and negative swings of an ac voltage.

12. The flyback switching power converter of claim 11, wherein the resistance is coupled to a return rail of the flyback switching power converter.

13. The flyback switching power converter of claim 11, the pair of zener diodes comprises:

a first zener diode, wherein an anode of the first zener diode is coupled to a first end of the resistance; and a second zener diode, wherein an anode of the second zener diode is coupled to a second end of a resistance, wherein a cathode of the second zener diode is coupled to a cathode of the first zener diode.

14. The flyback switching power converter of claim 11, the pair of zener diodes comprises:

a first zener diode, wherein a cathode of the first zener diode is coupled to a first end of the resistance; and a second zener diode, wherein an anode of the second zener diode is coupled to an anode of the first zener diode, wherein a cathode of the second zener diode is coupled to a second end of the resistance.

* * * * *